(No Model.)
C. A. CATLIN.
PROCESS OF CHARGING LIQUIDS WITH GAS.
No. 407,818. Patented July 30, 1889.
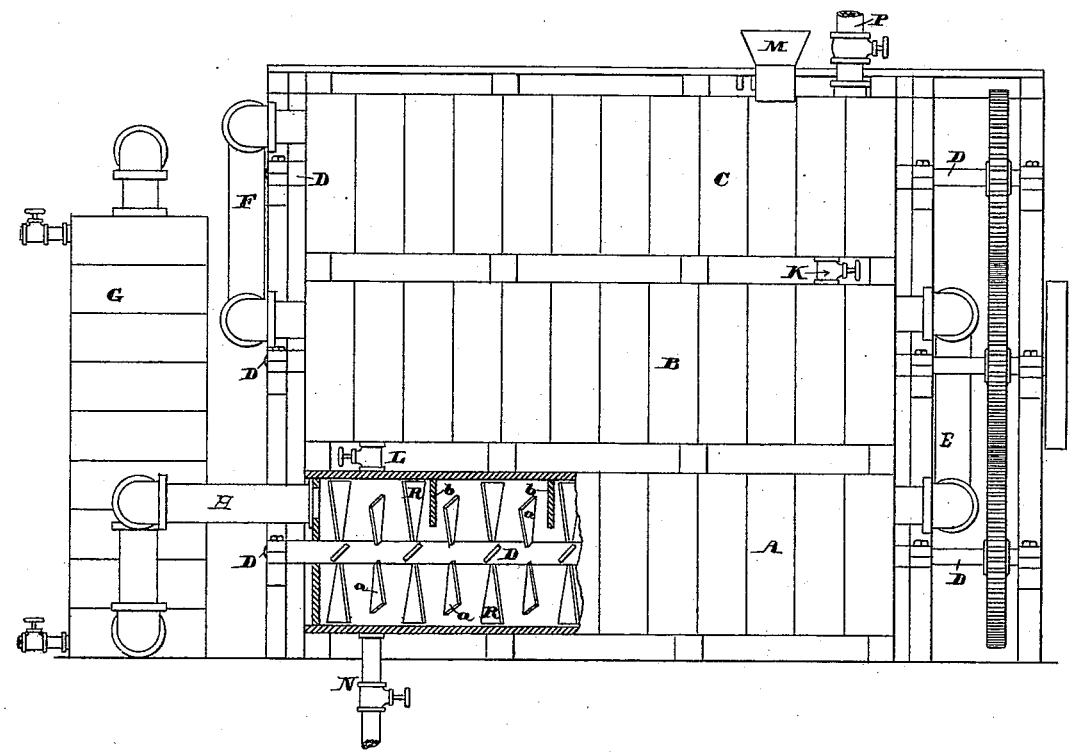

UNITED STATES PATENT OFFICE.

CHARLES A. CATLIN, OF PROVIDENCE, RHODE ISLAND.

PROCESS OF CHARGING LIQUIDS WITH GAS.

SPECIFICATION forming part of Letters Patent No. 407,818, dated July 30, 1889.

Application filed October 30, 1885. Serial No. 181,359. (No model.)

*To all whom it may concern:*

Be it known that I, CHARLES A. CATLIN, of Providence, in the State of Rhode Island, have invented a new and useful Improvement in Charging or Combining Liquid with Gas, of which the following is a specification.

The invention is applicable to mixed gases alone; and its object is to effect the separation of a pure gas from the mixed gas and the combination of such pure gas with the liquid in a more simple and expeditious manner than any hitherto known.

Broadly speaking, the methods of separating a pure gas from a mixed gas and combining the pure gas with a liquid heretofore used are two in number, of which one may be recognized by the use in one form or another of apparatus constructed upon the principle of the Woulf bottle, while the other is practiced by passing a current of mixed gas through a closed vessel or a series of closed vessels in one direction over the surface of a liquid continuously flowing through such vessel or vessels in the opposite direction, and at the same time agitating such flowing liquid, so that it is thrown up into the mixed gas. The well-known tower system or method may be considered as a combination of the two methods just mentioned. The tower method retains, while my method overcomes, the disadvantages of both.

The disadvantage of the Woulf bottle method is that either the mixed gas must be purified and the pure gas separated therefrom before it is passed through the liquid in the bottles (or the tanks taking the place of the bottles) or an unnecessary expenditure of force is required to drive the inert gases of the mixed gas through the liquid and entire apparatus.

The disadvantage of the other old method is the difficulty in regulating the continuous flow of the liquid through the apparatus, so that the product, as it flows from the apparatus in a continuous stream, shall be neither too little nor too much charged with the gas.

By my method the mixed gas passes over the surface of the main body of the liquid instead of through it, and the union between the liquid and the pure gas is assisted by agitators which throw up spray from the liquid into the mixed gas; but the liquid, instead of flowing through the apparatus continuously, is drawn intermittingly from tank to tank. As in apparatus already in use, after the operation has once begun the mixed gas, when strongest in the gas to be combined, is brought into contact with liquid already charged therewith to some extent, and thereafter, as it loses its strength in the gas to be combined, is brought necessarily into contact with liquid less and less charged therewith; but, so far as the liquid is concerned, the operation going on in each tank is distinct from that in any other. A charge of liquid does not lose its identity, but is progressively brought into contact with the mixed gas that is stronger and stronger in the gas to be combined. The strength of each charge is consequently known at all times by the workman.

My invention has been made with especial reference to the production of an acid sulphite solution of magnesia by exposing water holding powdered oxide of magnesium in suspension to the fumes of burning sulphur, which consist, mainly, of sulphurous acid and nitrogen. The process, however, is applicable to the combination of other solutions and gases. I have also devised apparatus for carrying out the process or method herein described, details of which form the subject-matter of another application for a patent, Serial No. 169,936, heretofore filed.

The apparatus which I employ and the mode of operation may be briefly described as follows: Several cylindrical tanks, each provided with an agitator, are connected in series from top to top, so that a gas entering one may flow freely through them all, passing along the upper portion of each tank in succession. The lower part of each tank is filled with the liquid to be charged or combined. The agitators consist, essentially, of arms adapted to revolve in vertical planes at right angles to the flow of the gas, and thus to pass repeatedly through the liquid below and the flowing gas above. The tanks are placed at different levels, and besides their connection from top to top by pipes for the passage of gas, as stated above, they are so connected by other pipes provided with stop-cocks that the liquid contents of the last tank to receive the gas may be drained at will into the next preceding tank in series, and so on. The mixed gas is passed through this apparatus until the liquid in the tank that is nearest the reservoir or generator is charged with the required gas to the proper extent. The liquid so charged is now drawn off from this first tank; but instead of supplying that tank with fresh liquid I draw into it the partially-charged liquid of the next tank, and into that next tank I draw the liquid of the tank beyond with such gas as it has taken up, and so on until the liquid, whatever may be its condition, is drawn from the last tank into the tank preceding the last tank; and this last tank I supply with fresh liquid.

In the drawing, I show, partly in elevation and partly in section, an apparatus such as I have used in manufacturing the acid sulphite of magnesia solution so largely employed in the production of wood-pulp.

A, B, and C are three cylindrical tanks, lying horizontally one above another. Each is provided with a horizontal shaft D, passing centrally through its heads or ends and having bearings outside thereof. Each shaft is provided with arms or paddles $a$ $a$, reaching from the shaft to near the wall or shell of the cylindrical tank. These arms or paddles are feathered in different directions. Suitable mechanism is provided for revolving these several shafts. The tanks A and B are connected at one side of the apparatus by a bent pipe E, entering the ends or heads of the said tanks at that side of the apparatus near the top, and in like manner on the other side of the apparatus the tanks B and C are connected by the pipe F.

G is the reservoir containing the mixed gas, of which sulphurous acid is one of the components, and H is a pipe leading from said reservoir to the first absorbing-tank A. A pipe K, provided with a stop-cock, as shown, connects tank C with tank B, so that the contents of the former may be drawn into the latter at will; and in like manner and for like purpose a pipe L, provided with a stop-cock, connects tank B with tank A.

M is a supply-funnel in the top of the upper tank C, and N is a discharge-pipe at the bottom of the lower tank A.

P is an escape-flue in the top of the last tank of the series at its rear end, by which the inert gases of the mixed gas finally escape.

Each tank is provided with several diaphragms or partitions $b$, extending down from the top between paddles on either side, as shown, to interrupt the direct current of the gas through the tank. They must not, however, be placed so low as to impede the passage of the inert gases, which form so large a proportion of the gas obtained by burning sulphur in air.

In operating the apparatus I first fill each tank A B C with water to within a short distance of the shaft, adding thereto the required quantity of finely-powdered calcined magnesite to give a liquor of the magnesia strength required, and then, setting the agitators in motion, admit into the tank A from the reservoir G, through the pipe H, the mixed gas obtained by burning sulphur or pyrites or any mixed gas containing sulphurous-acid gas or one of its components, however obtained. The draft in the escape-flue P must be strong enough to draw the gas through the whole apparatus, and in some instances it may be necessary to use a fan or blower in aid of the natural draft. The revolution of the agitators in the several tanks now throws up the water and the particles of magnesia held in suspension, bringing the magnesia in contact with the sulphurous acid. Little or no sulphurous acid escapes absorption in the lower tank until all or the greater part of the magnesia in that tank has been converted into the monosulphite, which, being but slightly soluble in water, still remains in the condition of fine solid particles suspended in the water. Gradually, as more gas is absorbed, these particles dissolve, and there is present in the tank a solution of the so-called "bisulphite," which chemical combination, if combination there be, is very slow, and hence quite a large proportion of the sulphurous acid escapes into the second tank, where, meeting with fresh magnesia, it is absorbed with avidity, and thus the formation of the monosulphite takes place while the so-called "bisulphite" is forming in the first tank. The process goes on in the first tank A even after the said bisulphite stage is reached. Since for the purpose required the liquid should be further impregnated with sulphurous acid, and this being only in mechanical acquisition, a still larger proportion of the sulphurous acid now escapes from the first tank A into the second tank B, and thus the liquid in the second tank becomes well advanced in the so-called "bisulphite" stage. Sulphurous acid now begins to pass into the third tank C, and the formation of the monosulphite begins in that tank, and this stage in the process is well advanced in the third tank when the water and magnesia of the lower tank have acquired the requisite sulphurous acid to be drawn off into the storage-tank through the pipe. The liquid contents of the first tank having been withdrawn and the valve in the discharge-pipe having been closed, the liquid contents of the second tank B, which is now well advanced in the so-called "bisulphite" stage, are drawn into the first tank A, and the contents of the third tank C, progressing in the monosulphite stage, are drawn into the second tank, and a new charge of water and calcined magnesite is introduced into the third tank, and so the process is continued, and we have, regulating the quantity of the gas-supply by the capacity of the tanks, three different stages of chemical combination proceeding within the different tanks: first, the mechanical impregnation;

second, the weaker chemical combination, and, third, the active chemical affinity which catches and retains the excessive wastes of the sulphurous acid from the others.

I claim—

The herein-described method of charging or combining liquid with gas, consisting in passing a current of mixed gas continuously through a series of tanks in one direction, passing the liquid intermittingly through the same tanks in the opposite direction, and agitating the liquid and gas, all substantially as described.

CHAS. A. CATLIN.

Witnesses:
    CHAUNCEY SMITH,
    W. W. SWAN.